Figure 1:
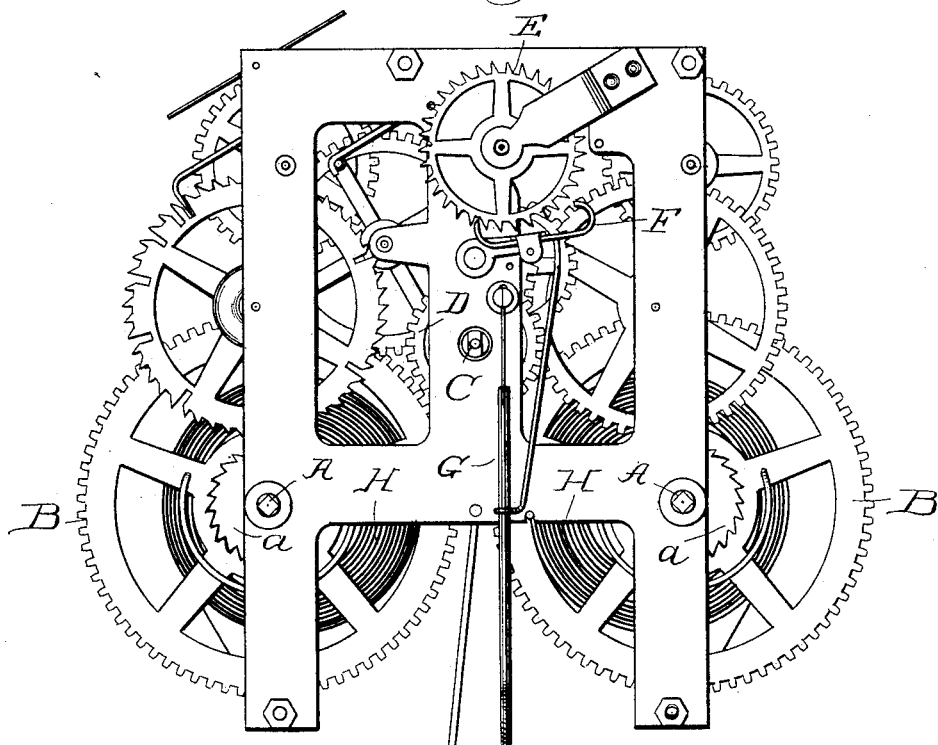

(No Model.) 2 Sheets—Sheet 1.

W. H. WRIGHT.
CLOCK GEARING.

No. 589,886. Patented Sept. 14, 1897.

Witnesses: Inventor:
Arthur L. Randall, By W. H. Wright
M. B. May Arthur W. Crossley
Atty.

(No Model.) 2 Sheets—Sheet 2.

W. H. WRIGHT.
CLOCK GEARING.

No. 589,886. Patented Sept. 14, 1897.

Witnesses.
Arthur F. Randall
M. B. May

Inventor:
W. H. Wright
By Arthur W. Crossley
Atty.

# UNITED STATES PATENT OFFICE.

WILLIAM H. WRIGHT, OF BRISTOL, CONNECTICUT.

CLOCK-GEARING.

SPECIFICATION forming part of Letters Patent No. 589,886, dated September 14, 1897.

Application filed March 28, 1896. Serial No. 585,303. (No model.)

*To all whom it may concern:*

Be it known that I, WILLIAM H. WRIGHT, of Bristol, in the county of Hartford and State of Connecticut, have invented certain new and useful Improvements in Clock-Gearing, of which the following is a specification.

This invention has relation generally to the works or movements by which a clock is set in motion and regulated and to machinery of a similar nature for other purposes; and it has reference particularly to the ratchet-wheel and other equipments of the first or main arbor of a clock-gearing.

Prior to this invention it was common to construct and apply the ratchet-wheel on the main arbor or shaft by casting the same of brass in the form of a disk or ring and forcing it upon the arbor so as to be securely held thereon by friction, then turning the same down to the shape of a wheel having an integral hub or sleeve projecting from the sides, and finally cutting the ratchet-teeth in the periphery of the wheel. The first or main wheel carrying the spring-pressure pawl to coöperate with the ratchet-wheel was then placed upon the inner part of the said hub or sleeve against the inner side of the ratchet-disk and a spring-washer was secured in place against the inner side of the first wheel, the motive spring being connected with the arbor beyond the parts mentioned. This form and method of construction was objectionable and imperfect for several reasons, among which were the high cost of making occasioned by the troublesomeness of such work and great expenditure of time in manufacture. Again, being made from cast-brass, it was necessarily soft, and hence subject to easy wear, and, moreover, the construction and arrangement of parts were such that slight torsional strain exerted on the main wheel was quite liable to displace its adjuncts, so as to allow the free end of the pawl to drop between the main and ratchet wheels and disorganize the train.

It is the object of this invention to provide improvements which will overcome the objections and mischief mentioned by materially simplifying, cheapening the cost of construction, making the ratchet-wheel very much harder, and hence more durable, and associating and securing the parts in place so as to avoid liability of the same becoming disarranged or disorganized.

To these ends the invention consists of the improvements which I will now proceed to describe in detail, and subsequently point out in the claims appended hereto.

Reference is to be had to the annexed drawings and to the letters marked thereon, forming a part of this specification, the same letters designating the same parts or features, as the case may be, wherever they occur.

Figure 8:
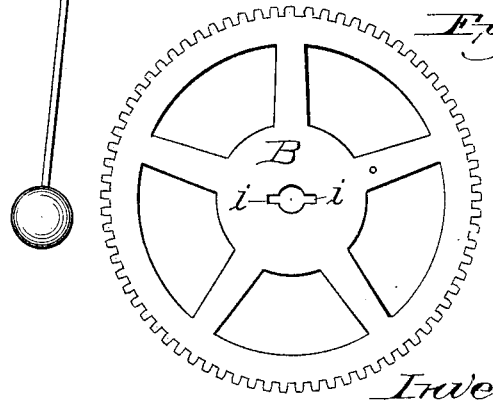
Figure 2:
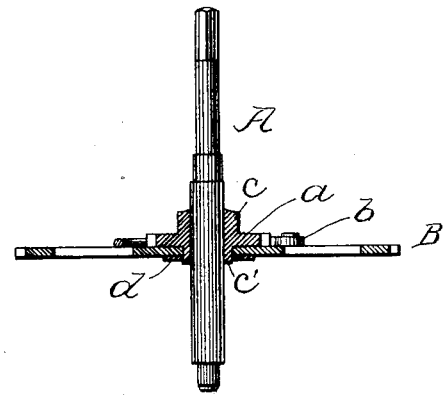
Figure 3:
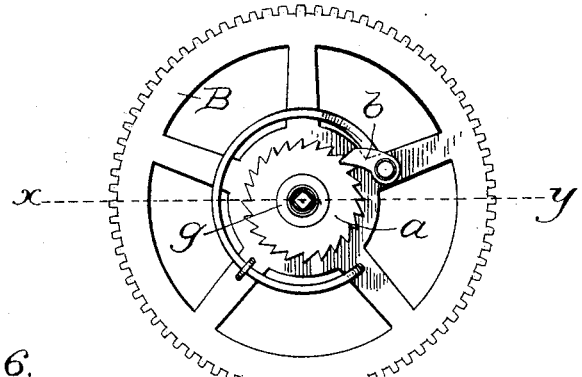
Figure 6:
Figure 7:
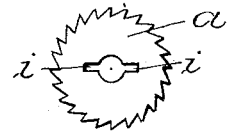
Figure 4:
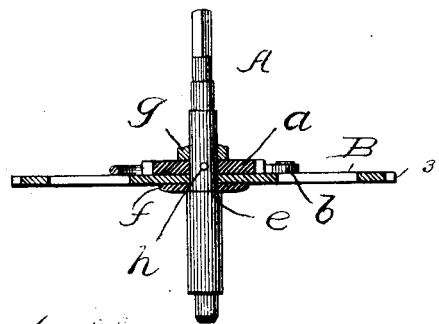
Figure 5:
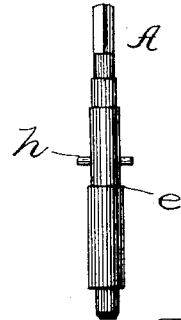

Of the drawings, Figure 1 is a front elevation of a clock movement or mechanism. Fig. 2 is a central sectional view through the immediate adjuncts of the first or main shaft, the latter being represented in full, showing the old form of means upon which my improvements have been wrought. Fig. 3 is a front view of the main or first arbor and its equipments embodying my improvements. Fig. 4 is a central sectional view of what is shown in Fig. 3. Fig. 5 is a plan of the main arbor constructed in accordance with my improvements. Fig. 6 is a detached view of the collet employed in connection with my improvements. Fig. 7 is a detached view of the ratchet-wheel constructed in accordance with my improvements. Fig. 8 is a detached view of the first or main wheel as employed in my improvements.

It will now be seen that Fig. 1 represents an organized clock mechanism, that Fig. 2 shows the old construction commonly employed in such mechanism, and that the remaining figures illustrate the improvements wrought by me in such mechanism.

In the said drawings, A designates the main or first arbors; B, the main or first wheels; C, the center arbor; D, the center or second wheel; E, the scape-wheel; F, the pallet controlling the motion of the pendulum G, and H the motive springs, (which might as well be cords and weights,) connected with the main arbors. These parts coöperate with trains of gears and coacting devices (not necessary herein to describe) in the make-up of a clock mechanism for indicating time by means of a dial and pointers and by sounding or striking the hours.

The main wheel B is of course loose upon the main arbor A, and to hold the same upon and in proper relationship to the arbor to secure time-keeping and a winding of the clock the ratchet-wheel *a* is secured to the said main arbor so as to turn therewith, and is connected by means of a coacting spring-pressed pawl b with the main wheel, so that in winding the clock the arbor and ratchet-wheel may turn independently of the main wheel, but so that in the running of the clock by the motive spring the arbor may turn or actuate the main wheel, all as is well understood by artisans who understand the construction and mode of operation of ordinary clock-trains.

Heretofore, as I have already intimated, the ratchet-wheel a has been formed by making a casting from brass of desired form and forcing said casting upon the main arbor so as to be held firmly thereon by friction, and this casting was turned down to form the ratchet-wheel, the teeth of which were cut after the act of turning down the wheel, which was also formed with the sleeve-hub c c', projecting from both sides. (See Fig. 2.) With this construction the main wheel B was arranged to turn on the hub c', and the spring-washer d was secured on the said hub inside of the said wheel, and the latter was connected with the ratchet-wheel by means of the spring-pressed pawl b, and attended with all the objections and difficulties heretofore mentioned.

In carrying out my invention I form upon the arbor A a shoulder e, which may be offset or inset or made in any other way to suit its purpose, against which I place a spring-washer f, placed upon the arbor from the front end, and then in the same manner I place upon the said arbor the first or main wheel B, which is arranged to turn loosely on the arbor. I then place upon the arbor a previously-formed and properly-hardened ratchet-wheel a, which is splined upon said arbor in any suitable way so as to turn therewith, and then force or sweat upon the arbor outside of the ratchet-wheel a collet g, so as to hold the parts in place.

In the present instance I have shown the ratchet-wheel secured upon the arbor by means of a spline-pin h. If this means should be used for the purpose mentioned, the said pin may be first put in place, as shown in Fig. 5, and the main wheel provided with slots i i, as shown in Fig. 8, so that it can be slipped over the pin h and be unaffected thereby when in place on the arbor. The ratchet-wheel a is also provided with slots i i, so that it may be passed over the spline-pin h and be held pinned to the arbor, as is clearly illustrated in Fig. 4.

Of course any other means for splining or fixing the ratchet-wheel a upon the arbor may be employed instead of the spline-pin h, this latter construction being shown merely as one that is convenient and efficient for the purpose mentioned.

I show the spring-washer located between the shoulder and the main wheel, and this I consider a preferable construction. It may as well, however, be placed between the ratchet-wheel and collet, its particular location not being a part of my invention, which consists in a clock-gearing of the nature described, constructed of parts made separately and afterward assembled.

By this invention I am enabled to make the ratchet-wheel as hard as the necessities of the case may require, so as to make the same durable and lasting. I am, furthermore, enabled to provide a construction which costs very much less than in the old form, and I am, moreover, enabled to overcome the liability of the parts upon the main arbor becoming displaced by torsional strain upon the main wheel or other parts, so as to permit the pawl b to drop between the ratchet-wheel and the main wheel with the mischief hereinbefore intimated. Again, in case of necessity I am able to make repairs with less trouble and expense than under the old construction, as illustrated in Fig. 2. This will readily appear to any one skilled in the art.

An accurate adjustment of the whole is essential, and under the old system if any accident or failure in adjustment occurred during manufacture the entire structure was substantially ruined.

My invention permits the rapid and cheap manufacture of separate, interchangeable parts. If any one part is defective, only that part is lost, and the whole construction is easily dismembered for this purpose and for purposes of repair.

Having thus explained the nature of the invention and described one way of constructing and using the same, without, however, attempting to set forth all the forms in which it may be embodied or all the modes of its use, I now declare that what I claim, and desire to secure by Letters Patent, is—

1. In a train of gearing for clocks, a main arbor formed with a shoulder, and provided with a spline, a spring-washer on said arbor and bearing against said shoulder, and a gear-wheel mounted directly on said arbor to turn loosely thereon, and bearing against said washer, in combination with a ratchet-wheel on said arbor and engaged by said spline to connect it fixedly with the arbor, and a collet on said arbor for holding the gear-wheel and the ratchet-wheel against movement on the arbor longitudinally of the latter.

2. The herein-described portion of a clock-gearing, which consists of a main arbor having a shoulder integral therewith, a gear-wheel loose on the arbor provided with the spring-controlled pawl, a previously-cut ratchet-wheel attached fixedly to the arbor and bearing against said gear-wheel, a spring-washer, and a collet on said arbor to hold the parts firmly against said shoulder, all so constituted and arranged that the parts may each be made separately and easily combined in manufacture substantially as described.

In testimony whereof I have signed my name to this specification, in the presence of two subscribing witnesses, this 21st day of November, A. D. 1895.

WILLIAM H. WRIGHT.

Witnesses:
WM. S. INGRAHAM,
ROGER S. NEWELL.